Figure 1:
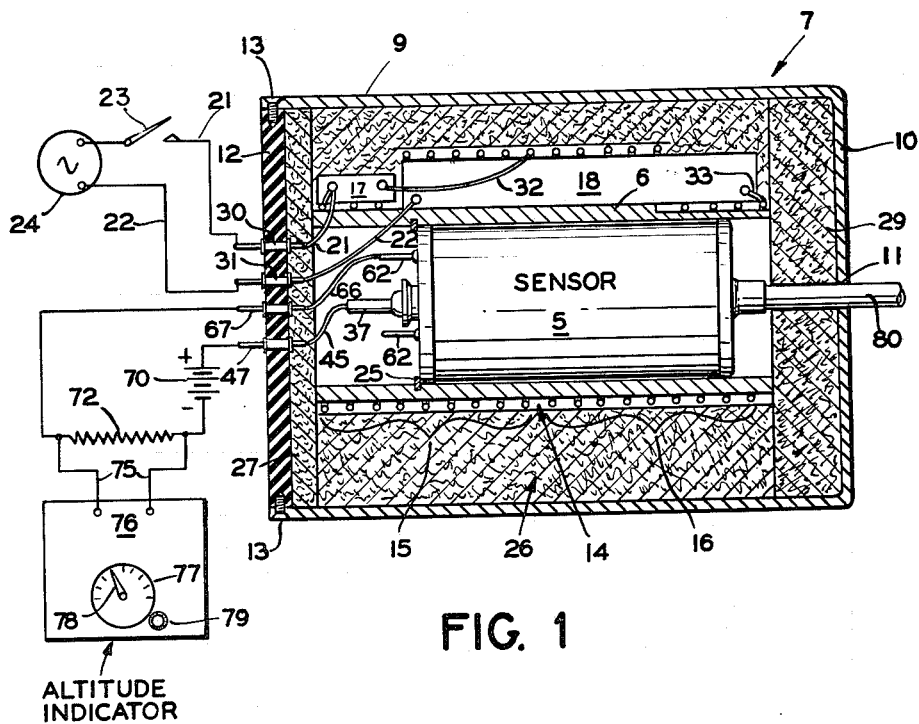

June 11, 1963 J. STEENFELD ETAL 3,093,792
ION AIR DENSITY SENSOR FOR ATMOSPHERIC
PRESSURE AND ALTITUDE MEASUREMENTS
Filed March 16, 1960 2 Sheets-Sheet 1

INVENTORS
JOSEPH STEENFELD
GEORGE V. ZITO
BY Herbert L. Davis
ATTORNEY

INVENTORS
JOSEPH STEENFELD
GEORGE V. ZITO
BY Herbert L. Davis
ATTORNEY () # United States Patent Office 3,093,792
Patented June 11, 1963

3,093,792
ION AIR DENSITY SENSOR FOR ATMOSPHERIC PRESSURE AND ALTITUDE MEASUREMENTS
Joseph Steenfeld, North Arlington, and George V. Zito, Northvale, N.J., assignors to The Bendix Corporation, a corporation of Delaware
Filed Mar. 16, 1960, Ser. No. 15,449
13 Claims. (Cl. 324—33)

This invention relates to improvements in an ion air density sensor for effecting altitue measurements of a type such as disclosed and claimed in copending U.S. application Serial No. 693,323, filed October 30, 1957 by George V. Zito and assigned to Bendix Aviation Corporation, assignee of the present invention, and more particularly to a novel ion air density sensor to provide an output signal proportional to the pressure of the sampled air.

In such an ion air density sensor there may be an air chamber in which an electrostatic field is supplied by the application of a direct current voltage to a pair of electrodes and there is fixed within the chamber a source of radioactive material of relatively long life. Suitable materials may be used such as pure beta emitters, such as tritium, or radium sources may be fabricated which are more permanent and reliable than the tritium type. In the air chamber of the sensor the charged particles emitted will ionize the air within the chamber, and the ions so produced will drift to the cathode and be collected, the electrons to the anode. The flow of electrons may be measured by inserting a high value resistance in series with the electrodes. The number of ions or electrons produced within a fixed volume with a fixed quantity of radioactive material will be a direct function of the concentration of gas molecules, if certain precautions are taken with respect to electrode geometry. Since the number of gas molecules per unit volume is the gas density, it is apparent that the output current is directly proportional to the density of the gas present, or if the temperature is maintained constant, to the gas pressure. At constant temperature, gages may be constructed which provide linear outputs as a function of pressure corresponding to altitudes from sea level to over 300,000 feet.

An object of the invention is to provide a novel ion air density sensor including a thermally controlled oven to maintain the temperature of the sampled air within the sensor at a predetermined constant temperature so that the sensor may provide an output signal proportional to the pressure, rather than the density, of the atmospheric air.

Another object of the invention is to provide an ion air density sensor in which there is a novel baffle plate assembly so arranged that air entering from the adit is brought into close thermal equilibrium with an outer casing of the sensor and the temperature of a thermally controlled oven surrounding the outer casing, before the air may enter a system of cylindrical baffles where it is subjected to the ionization radiation.

Another object of the invention is to provide in such a thermally controlled ion air density sensor a "dead-ended" baffle arrangement whereby the sensor may in effect breathe the sampled atmospheric air and maintain the same at a substantially constant temperature during subjection to the ionization radiation as distinguished from an arrangement in which there may be an appreciable air flow into the sensor from the atmosphere with the attendant wide variations in the temperature of the sampled air.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 2:
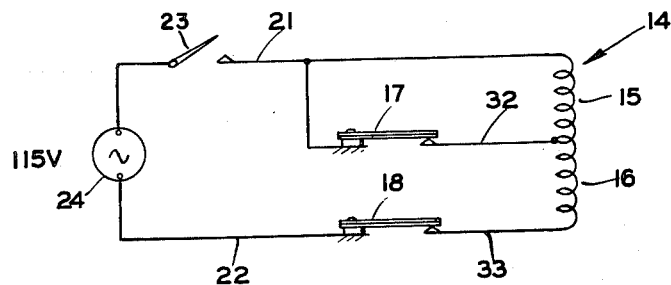
Figure 3:
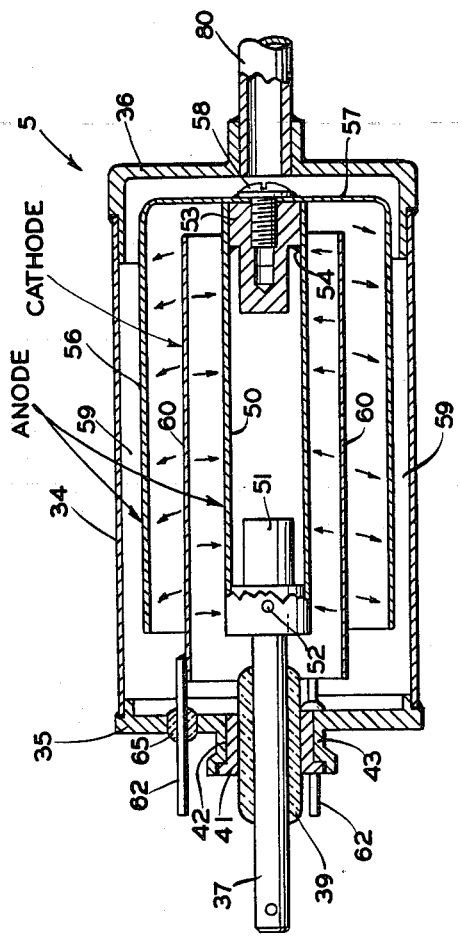
Figure 4:
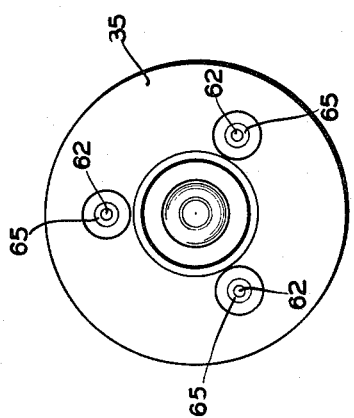

In the drawings:
FIGURE 1 is a schematic showing of the sensor and oven in assembled relation.
FIGURE 2 is a schematic wiring diagram of the heater coils and thermostatic controls for the oven.
FIGURE 3 is a sectional view of the sensor.
FIGURE 4 is an end view of the sensor.

Referring to the drawing of FIGURE 1, there is indicated generally by the numeral 5 an air density sensor device positioned within a tubular member 6 of copper or other good heat conducting material. The member 6 is in turn positioned within an oven 7 including a casing 9 having at one end a plate 10 with an aperture 11 therein and at the opposite end a panel 12 of a suitable electrical insulation material removably fastened therein by bolts 13. There is further provided a heater assembly including heater coils 15 and 16 wound on the tubular member 6 and surrounding the sensor device 5.

The heater coils 15 and 16 are controlled by a coarse thermostatic switch 17 and a highly sensitive thermostatic switch 18 mounted on the tubular member 6, as shown in FIGURE 1. The thermostatic switches 17 and 18 may be of a conventional bimetal type each carried within a suitable casing and arranged to control the energizing circuit for the heater coils 15 and 16, as shown diagrammatically by FIGURE 2, so as to maintain the temperature within the oven 7 at a substantially constant predetermined value of, for example, 100° C. within ±.1° C. so that the temperature of the sampled air within the sensor 5 may be maintained at the predetermined constant value so as to effect, as hereinafter explained, a sensor output current directly proportional to the atmospheric pressure at the prevailing altitude level.

In the arrangement, as shown in FIGURE 2, both the bimetallic thermostatic switch 17 and the bimetallic thermostatic switch 18 are initially closed so that upon the operator connecting conductors 21 and 22 across a suitable source of electrical energy 24 by closing a main control switch 23 the thermostatic switch 17 initially shunts the heater coil 15 so that the full energizing current is applied through the switch 17 and switch 18 to the coil 16. The energized heater coil 16 then rapidly increases the temperature within the oven 7 until the temperature approaches within a predetermined range of the desired temperature whereupon the switch 17 opens effecting energization of both the heater coil 15 together with heater coil 16 until as the desired temperature is reached the highly sensitive thermostatic switch 18 opens and thereafter regulates the temperature within the oven 7 to the desired value by closing and opening the energizing circuit to the heater coils 15 and 16 as the regulated temperature value drops below and increases to the desired value.

As shown in FIGURE 1, the sensor device 5 is slidably mounted within the tubular member 6 so as to fit against a retaining ring 25 carried within the tubular member 6. Surrounding the sensor device 5 and tubular member 6 is the heater assembly 14 which in turn has wrapped around the assembly a blanket 26 of a suitable heat insulation fiberglass material which is packed into the space between the inner surface of the casing 9 and the tubular member 6. Further packed between the inner surface of the panel 12 and an end of the tubular member 6 is a pad 27 of such heat insulation fiberglass material while packed between the opposite end of the tubular member 6 and the inner surface of the end plate 10 is another pad 29 of the fiberglass material so that the heater assembly 14, tubular member 6 and sensor device 5 are supported by the fiberglass heat insulation wrapping 26 and pads 27 and 29 within the oven 7 and maintained therein under the predetermined regulated temperature of for example 100° C. within ±.1° C.

As shown in FIGURE 1, the electrical conductor 21 leads from the heater coil 15 and coarse thermostatic switch 17 through the fiberglass pad 27 to a terminal 30 mounted in the insulation panel 12 while the electrical conductor 22 leads from the highly sensitive thermostatic switch 18 controlling the heater coil 16 through the fiberglass pad 27 to a terminal 31 mounted in the panel 12. A conductor 32 leads from a center tap between heater coils 15 and 16 while a conductor 33 leads from an end of heater coil 16 to the switch 18. The conductor 32 leads from the center tap to switch 17.

The ion air density sensor 5, as shown in detail in FIGURE 3, includes a cylindrical casing 34 of a suitable heat conducting material such as copper having soldered thereto at opposite ends thereof copper end plates 35 and 36.

A steel or Kovar rod 37 is concentrically mounted in the end plate 35 by a glass or porcelain electrical insulator member 39 sealed hermetically to member 41 which is engaged at 42 in a portion 43 of the end plate 35. The rod 37 is connected at one end to an electrical conductor 45 extending through the fiberglass pad 27 to an electrical terminal 47 mounted in the panel 12 of the oven 7. The opposite end of the bar 37 extends into the cylindrical casing 34 and has secured thereto a hollow tubular member 50 having a low thermal mass. The bar 37 has affixed thereto a portion 51 which provides an end support for the tubular member 50 to which the member 50 is fastened at 52. In the opposite end of the member 50 there is provided a second end portion 53 which may be soldered therein at 54.

There is further provided a cup-shaped cylindrical member 56 having a closed end portion 57 secured concentrically to the end portion 53 by a bolt 58 soldered to portion 57, and positioned within the cylindrical casing 34 in spaced relation to the casing 34 and the tubular member 50 so as to provide a space or air passageway 59 between the member 56 and the end plate 36 and casing 34.

Furthermore the outer surface of the member 50 and an inner surface of the member 56 may be nickel polished and rhodium plated so as to provide an anode element comprising the two concentric cylinders 50 and 56 which completely enshrouds a radioactive cylindrical member 60 which serves as a cathode element for the sensor 5.

The cathode member 60 is positioned in spaced relation intermediate the concentric cylinders 50 and 56 and is affixed at one end to three steel or Kovar supporting pins 62 mounted in the end plate 35 by glass or porcelain insulation members 65 through which the supporting pins 62 extend to the exterior of the sensor 5. An electrical conductor 66 leads from an outer end of one of the supporting pins 62 and passes through the fiberglass pad 27 to an electrical terminal 67 mounted in the panel 12 of the oven 7.

The cylindrical cathode member 60 may be formed of silver impregnated at the inner and outer surfaces of the member 60 with radium chloride and then rhodium plated to trap the radon produced as a consequence of radioactive decay and so as to provide an ionizing source so arranged that alpha particles emitted by the radioactive material bombard the air molecules of the sampled air within the space between the cathode member 60 and the inner surface of the cylindrical member 56 and the outer surface of the tubular member 50 to produce positive and negative ions.

As shown in FIGURE 1, the anode members 50 and 56 are connected through terminal 47 to a positive terminal of a source of electrical energy or biasing voltage such as a battery 70, while the negative terminal of the battery 70 may be connected through a resistor 72 to the terminal 67 leading to the cathode member 60, while output lines 75 lead from across the resistor 72 to provide an output signal voltage directly proportional to the density, or with temperature stabilization to the pressure of the sampled atmospheric air so as to control an altitude indicator electrical control mechanism 76 which may be of a type such as explained in the aforenoted U.S. application Serial No. 693,323.

The mechanism 76 may include a dial 77 having indicia thereon cooperating with an indicator pointer 78 adjustably positioned by a servomotor in the mechanism 76 to indicate the prevailing altitude. The dial 77 may be initially adjusted relative to the indicator pointer 78 by suitable means such as a manually operable knob 79 drivingly connected to the dial 77 in a manner well known in the altimeter art. Thus the indicia on the dial 77 may be initially set so as to correct for variations in the barometric pressure or air density from the standard condition at a given altitude level of, for example, sea level and after which correction the pointer 78 may coincide with the correct indicia at the given altitude level while at other altitude levels the indicator pointer 78 will be adjusted through the mechanism 76 so as to coincide with such initially adjusted indicia to indicate the altitude level under the then prevailing barometric pressure and air density condition.

In the sensor 5, the positive ions produced upon ionization of the sampled air are attracted to the negative electrode or cathode member 60 owing to the electrostatic field within the chamber of the sensor 5 produced by the battery 70 while the negative ions or electrons migrate toward the positive electrode or anode members 50 and 56 and to the positive terminal of the battery 70. There is in turn an electron flow from the negative terminal of the battery 70 through the resistor 72 (proportional to the density or pressure of the air sampled at the sensor 5) and to the positive terminal of the battery 70 to complete the electrical circuit. The alpha particles provide a very constant source of ionization potential, and thus the control current flow obtained is a function of the molecular density of the gas filling the space between the cathode 60 and the anode members 50 and 56.

Thus, as the density of the sampled air increases the output control current across the resistance 72 increases while as the density of the sampled air decreases the output control current across the resistance 72 decreases because of the variation in the total number of gas molecules ionized in the sampled air.

Opening into the casing 34 at a point concentric with the end portion 57 of the cylindrical cup-shaped member 56 is an air inlet conduit or tube 80 extending through the aperture 11 and leading from a static pressure probe, such as a Pitot static probe of conventional type mounted on an aircraft. The tubing 80 has a minimum length and a diameter sufficiently large so as to minimize pneumatic time lags due to air flow where pressure is changing rapidly.

The arrangement is such that air under the prevailing atmospheric pressure at the level of flight of the aircraft on entering at the adit or air inlet tube 80 is baffled by the end portion 57 of the cup-shaped anode member 56 so that it must pass through the passageway 59 formed between the casing 34 and the member 56 so as to be brought into a close thermal equilibrium with the casing 34, before entering the system of concentric cylinders and passing in turn between the anode member 56 and cathode member 60 and the cathode member 60 and the anode member 50 where the sampled air is subjected to ionizing radiation. The sensor 5 is thus "dead-ended" so as to in effect breathe the atmosphere to be measured upon changes in the effective pressure thereof rather than being subjected to appreciable air flow.

Thus, upon an increase in the prevailing atmospheric pressure as upon a decrease in the altitude of the aircraft the sampled air under such increase in pressure tends to move under compression within passageway 59 along the inner surface of the casing 34 before being subject to ionization while upon a decrease in the prevailing atmospheric pressure as upon an increase in the altitude of the aircraft, the sampled air within the sensor 5 upon such decrease in the atmospheric pressure applied thereto tends to move within the passageway 59 upon decompression and out the conduit 80 so as to equalize the pressure of the sampled air within the sensor device 5 with that of the atmospheric pressure prevailing at the level of flight of the aircraft.

Operation

The interior of the density sensor device 5 provides a relatively small chamber connected to the static pressure probe by means of the tubing 80 having minimum length and a diameter sufficiently large so as to minimize pneumatic time lags due to air flow when the effective atmospheric pressure at the prevailing level of flight of the aircraft is changing rapidly. The sensor device 5 produces across the output lines 75 an electrical signal voltage whose magnitude is a function of the molecular density of the sampled atmospheric air within the chamber of the sensor device 5.

The sensor device 5 is mounted within a temperature-controlled housing or oven 7 so that the temperature of the sampled air is maintained at a predetermined substantially constant temperature value. Thus when the sampled atmospheric air within the interior chamber of the sensor device 5 becomes temperature stabilized, the ion density of the sampled air will change linearly with static pressure and the output of the sensor will be linear with static pressure. The ion density sensor is capable of operation to heights of 300,000 feet.

This type of sensor has several important merits: it has no moving parts; its stability under vibration and lateral accelerations is a marked advance over previous methods of sensing; there is no appreciable hysteresis; there is no problem of altitude error in the sensor, throughout a broad altitude range the sensor has exceptionally good accuracy and good resolution.

The small volume of the ion density sensing portion of the sensor (approximately 2.3 cubic inches) is well suited for obtaining the desired pneumatic response. Time constant and response characteristics of the sensor will, therefore, be mainly a function of the lag introduced in the pneumatic line from the Pitot-static probe to the sensor 5. If necessary, the sensor 5 may be located remote from the computer or altitude indicator electrical control mechanism 76 and adjacent the Pitot-static probe so as to minimize pneumatic lags.

Such an ion density sensor for the measurement of small gas pressures is capable of sensing with reasonable accuracy the total number of gas molecules per unit volume, rather than relying upon small incremental pressure changes to perform some mechanical function such as the operation of a force balance device or displacement of a diaphragm with the attendant mechanical faults and inaccuracies.

While a molecular measurement device such as the ion density sensor 5 provides fundamentally a measurement of density, the pressure equivalent for such a density measurement may be derived from the output signal applied across the lines 75 of the sensor 5 upon the sampled atmospheric air being maintained at a substantially constant temperature by the oven 7, as in the present invention.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In an air density sensor device of a type including spaced anode and cathode elements for providing a sampling zone therebetween, means for supplying air under prevailing atmospheric pressure to said sampling zone, and means to ionize the air in the sampling zone; the improvement comprising heating means to maintain the air in the sampling zone at a predetermined constant temperature, said heating means including a casing, a tubular heat conducting member for carrying said air density sensor device therein, heat insulation means surrounding the tubular member and supporting the tubular member within the casing, heater coils surrounding the tubular member, and thermostatic switch means carried by the tubular member for regulating energization of said heater coils in response to the temperature of said heating means so as to maintain the air in the sampling zone at said predetermined constant temperature, and electrical means operatively connected between the anode and cathode elements to provide an output signal from said air density sensor device directly proportional to said atmospheric pressure.

2. For use on an aircraft, a device for indicating the altitude of flight of said aircraft, said device being of a type including an air density sensor having spaced anode and cathode elements for providing a sampling zone therebetween, conduit means for supplying air to said sampling zone under prevailing atmospheric pressure, and an ionizing material on one of the elements to ionize the air in the sampling zone; said device including the improvement comprising a casing, a tubular heat conducting member to carry the aforementioned air density sensor therein, heat insulation material surrounding the tubular member and positioned at the opposite ends thereof for supporting the tubular member within the casing, heater coils mounted on the tubular member, thermostatic switch means carried by the tubular member for regulating energization of said heater coils in response to the temperature of said heater coils so as to maintain the air in the sampling zone at a predetermined constant temperature, a source of electrical energy and electrical resistor means serially connected between the anode and cathode elements, output lines leading from across the electrical resistor means to provide an output signal voltage directly proportional to the prevailing atmospheric pressure at the altitude of flight of the aircraft, and an altitude indicator means operatively connected to said output lines.

3. The improvement defined by claim 2 in which said heat insulation material includes a fiberglass blanket extending around the tubular member and fiberglass pads positioned at opposite ends of said tubular member so that said tubular member, heater coils and thermostatic switch means together with the air density sensor carried by said tubular member may be supported within the casing by the fiberglass blanket and pads.

4. A density sensor device comprising a casing, a pair of coaxial members positioned within said casing in spaced relation to provide a first electrode, another member extending between said pair of coaxial members in spaced relation thereto to provide a second electrode, said other member cooperating with said pair of coaxial members to provide sampling zones therebetween, and one of said electrodes having surfaces bearing a radioactive material to effectively ionize the sampling zones, conduit means opening into said casing for applying a gaseous medium under a variable pressure within said casing, said casing having an inner surface spaced from said pair of coaxial members so as to provide a passageway for the gaseous medium to the sampling zones between said pair of coaxial members and said other member upon compression thereof and out of the sampling zones upon decompression thereof during variations in the pressure of the gaseous medium applied within said casing through said conduit means, heating means surrounding the casing, and thermostatic means responsive to the temperature of the heating means for controlling the heating means so as to regulate the temperature of the gaseous medium within said passageway and sampling zones to a predetermined constant temperature.

5. A density sensor device comprising a casing, a pair of coaxial members positioned within said casing in spaced relation to provide a first electrode, another member extending between said pair of coaxial members in spaced relation thereto to provide a second electrode, said other member cooperating with said pair of coaxial members to provide sampling zones therebetween, and one of said electrodes having surfaces bearing a radioactive material to effectively ionize the sampling zones, conduit means opening into said casing for applying a gaseous medium under a variable pressure within said casing, said casing having an inner surface spaced from said pair of coaxial members so as to provide a passageway for the gaseous medium to the sampling zones between said pair of coaxial members and said other member upon compression thereof and out of the sampling zones upon decompression thereof during variations in the pressure of the gaseous medium applied within said casing through said conduit means, heating means including heater coils surrounding the casing, temperature responsive means for controlling energization of the heater coils so as to regulate the temperature of the gaseous medium within said passageway and sampling zones to a predetermined constant temperature, and electrical means operatively connected between said electrodes for effecting an output signal directly proportional to the pressure of the gaseous medium.

6. An air density sensor device comprising a casing, a first electrode assembly including a tubular member supported at one end by the casing and positioned within the casing, a cup-shaped cylindrical member having an end portion affixed to a free end of the tubular member and a cylindrical portion positioned in coaxial spaced relation to the tubular member, a second electrode assembly including another cylindrical member supported at one end by the casing and positioned between the tubular member and the cylindrical portion of the cup-shaped member in axial spaced relation thereto, said other cylindrical member having inner and outer surfaces bearing radioactive material to effect ionization of air in a first sampling zone between the inner surface of said other cylindrical member and said tubular member and a second sampling zone between the outer surface of said other cylindrical member and said cylindrical portion of said cup-shaped member, a conduit for supplying air under prevailing atmospheric pressure, said conduit having an opening into said casing coaxial with the end portion of the cup-shaped cylindrical member, said cup-shaped cylindrical member being supported by said tubular member within said casing in spaced relation to inner surfaces of said casing so as to provide a passageway for applying the air under the prevailing atmospheric pressure between said sampling zones and the opening in said casing to the conduit.

7. An air density sensor device comprising a casing, a first electrode assembly including a tubular member supported at one end by the casing and positioned within the casing, a cup-shaped cylindrical member having an end portion affixed to a free end of the tubular member and a cylindrical portion positioned in coaxial spaced relation to the tubular member, a second electrode assembly including another cylindrical member supported at one end by the casing and positioned between the tubular member and the cylindrical portion of the cup-shaped member in axial spaced relation thereto, said other cylindrical member having inner and outer surfaces bearing radioactive material to effect ionization of air in a first sampling zone between the inner surface of said other cylindrical member and said tubular member and a second sampling zone between the outer surface of said other cylindrical member and said cylindrical portion of said cup-shaped member, a conduit for supplying air under prevailing atmospheric pressure, said conduit having an opening into said casing coaxial with the end portion of the cup-shaped cylindrical member, said cup-shaped cylindrical member being supported by said tubular member within said casing in spaced relation to inner surfaces of said casing so as to provide a passageway for applying the air under the prevailing atmospheric pressure between said sampling zones and the opening in said casing to the conduit and along the inner surfaces of said casing so as to effectively equalize the temperature of the casing and the air within the casing, means for heating the casing, means responsive to the temperature of the heating means for controlling the heating means so as to regulate the temperature of the air within the passageway and sampling zones to a predetermined constant temperature, and electrical means operatively connected between said first and second electrode assemblies for effecting an output signal directly proportional to the prevailing atmospheric pressure of the air.

8. For use in an aircraft, the combination comprising a first casing, a first electrode assembly including a tubular member supported at one end by the first casing and positioned within the first casing, a cup-shaped cylindrical member having an end portion affixed to a free end of the tubular member and a cylindrical portion positioned in coaxial spaced relation to the tubular member, a second electrode assembly including another cylindrical member supported at one end by the first casing and positioned between the tubular member and the cylindrical portion of the cup-shaped member in axial spaced relation thereto, said other cylindrical member having inner and outer surfaces bearing radioactive material to effect ionization of air in a first sampling zone between the inner surface of said other cylindrical member and said tubular member and a second sampling zone between the outer surface of said other cylindrical member and said cylindrical portion of said cup-shaped member, a conduit for supplying air under prevailing atmospheric pressure, said conduit having an opening into said first casing coaxial with the end portion of the cup-shaped cylindrical member, said cup-shaped cylindrical member being supported by said tubular member within said first casing in spaced relation to inner surfaces of said first casing so as to provide a passageway for applying the air under the prevailing atmospheric pressure between said sampling zones and the opening in said first casing to the conduit and along the inner surfaces of said first casing so as to effectively equalize the temperature of the first casing and the air within the first casing, means for heating the first casing including a tubular heat conducting member to carry the first casing, a second casing, heat insulation material surrounding the tubular member and positioned at the opposite ends thereof for supporting the tubular member within the second casing, heater coils mounted on the tubular member, thermostatic switch means carried by the tubular member for regulating energization of said heater coils in response to the temperature of said heater coils so as to maintain the air in the sampling zone at a predetermined constant temperature, a source of electrical energy and electrical resistor means serially connected between the anode and cathode elements, output lines leading from across the electrical resistor means to provide an output signal voltage directly proportional to the prevailing atmospheric pressure at the altitude of flight of the aircraft, and an altitude indicator means operatively connected to said output lines.

9. The combination defined by claim 8 in which said heat insulation material includes a fiberglass blanket positioned around the tubular member and fiberglass pads positioned at opposite ends of said tubular member so that said tubular member, heater coils and thermostatic switch means may be supported within the second casing by the fiberglass blanket and pads.

10. For use on an aircraft an air density sensor device to provide a measure of the altitude of flight of the aircraft, said device being of a type including spaced anode and cathode elements for providing a sampling zone therebetween, means for supplying air under prevailing atmospheric pressure to said sampling zone at varying altitudes of flight of the aircraft, and means to ionize the air in the sampling zone; the improvement comprising heating means to maintain the air in the sampling zone at a predetermined substantially constant temperature during the flight of the aircraft at varying altitudes, and electrical means operatively connected between the anode and cathode elements to provide an output signal from said air density sensor device controlled by the density of the sampled air maintained at said substantially constant temperature so that said output signal is directly proportional to said atmospheric pressure to effectively measure the prevailing altitude of the aircraft.

11. For use on an aircraft an air density sensor device to provide a measure of the altitude of flight of the aircraft, said device being of a type including spaced anode and cathode elements for providing a sampling zone therebetween, means for supplying air under prevailing atmospheric pressure to said sampling zone at varying altitudes of flight of the aircraft, and means to ionize the air in the sampling zone; the improvement comprising heating means to maintain the air in the sampling zone at a predetermined substantially constant temperature during the flight of the aircraft at varying altitudes, said heating means including heater coils surrounding said air sampling zone, and thermostatic means responsive to the temperature of the heating means for regulating energization of said heater coils so as to maintain the air in the sampling zone at said predetermined substantially constant temperature, and electrical means operatively connected between the anode and cathode elements to provide an output signal from said air density sensor device controlled by the density of the sampled air maintained at said substantially constant temperature so that said output signal is directly proportional to said atmospheric pressure to effectively measure the prevailing altitude of the aircraft.

12. For use on an aircraft an air density sensor device to provide a measure of the altitude of flight of the aircraft, said device being of a type including spaced anode and cathode elements for providing a sampling zone therebetween, means for supplying air under prevailing atmospheric pressure to said sampling zone at varying altitudes of flight of the aircraft, and means to ionize the air in the sampling zone; the improvement comprising heating means to maintain the air in the sampling zone at a predetermined substantially constant temperature during the flight of the aircraft at varying altitudes, said heating means including heater coils surrounding said air sampling zone, and thermostatic means responsive to the temperature of the heating means for regulating energization of said heater coils so as to maintain the air in the sampling zone at said predetermined substantially constant temperature, and electrical signal producing means including a source of electrical energy and electrical resistor means serially connected between the anode and cathode elements, and output lines leading from across the electrical resistor means so as to provide an output signal voltage controlled by the density of the sampled air maintained at said substantially constant temperature so that said output signal voltage is directly proportional to said atmospheric pressure to effectively measure the prevailing altitude of the aircraft.

13. For use in an aircraft a molecular density sensor device of a type including spaced anode and cathode elements for providing a sampling zone therebetween, means for applying air to said sampling zone at a pressure corresponding to the prevailing atmospheric pressure at the altitude of flight of the aircraft, and means to ionize the air in the sampling zone; the improvement comprising heating means to maintain the air in the sampling zone at a predetermined substantially constant temperature during flight of the aircraft at varying altitudes, and means operatively connected between said anode and cathode elements to provide an electrical output signal controlled by the molecular density of the air in the sampling zone under the prevailing atmospheric pressure and at said substantially constant temperature to effectively measure the altitude of flight of the aircraft.

References Cited in the file of this patent

UNITED STATES PATENTS

| | | |
|---|---|---|
| 1,421,720 | Roberts | July 4, 1922 |
| 2,854,625 | Dudley et al. | Sept. 30, 1958 |
| 2,908,819 | Marx | Oct. 13, 1959 |
| 2,921,210 | Schaschl et al. | Jan. 12, 1960 |
| 2,934,694 | Vacca | Apr. 26, 1960 |